United States Patent [19]

Tada

[11] Patent Number: 5,020,065
[45] Date of Patent: May 28, 1991

[54] SEMICONDUCTOR LASER DEVICE

[75] Inventor: Katsuhisa Tada, Itami, Japan

[73] Assignee: Mitsubishi Denki Kabushiki Kaisha, Japan

[21] Appl. No.: 461,915

[22] Filed: Jan. 8, 1990

[30] Foreign Application Priority Data

Sep. 5, 1989 [JP] Japan ................... 1-229503

[51] Int. Cl.⁵ .............................. H01S 3/19
[52] U.S. Cl. ........................ 372/44; 372/34; 357/72; 357/74; 350/338
[58] Field of Search .............. 372/44, 34, 106, 703; 357/72, 74; 350/338, 337, 381, 382, 387, 394, 395

[56] References Cited

U.S. PATENT DOCUMENTS

| | | | |
|---|---|---|---|
| 3,837,729 | 9/1974 | Harsch | 350/338 |
| 4,422,730 | 12/1983 | Kozaki et al. | 350/338 |
| 4,545,648 | 10/1985 | Shulman et al. | 350/338 |
| 4,763,993 | 8/1988 | Vogeley et al. | 350/338 |
| 4,799,770 | 1/1989 | Kahn et al. | 350/338 |
| 4,861,142 | 8/1989 | Tanaka et al. | 350/338 |

FOREIGN PATENT DOCUMENTS 62-52511  3/1987  Japan.
62-298195 12/1987  Japan.
63-84185  4/1988  Japan.

Primary Examiner—Georgia Epps
Attorney, Agent, or Firm—Leydig, Voit & Mayer

[57] ABSTRACT

A semiconductor laser device comprise a semiconductor laser light emitting element, and a cap that covers and hermetically seals the laser light emitting element in a package. Laser light emitted from the element goes out through a hole formed in the top wall of the cap. A reflected light blocking element is disposed in the hole in the top wall of the cap. The reflected light blocking element includes a twisted-nematic liquid crystal cell and a pair of polarizers between which the twisted-nematic liquid crystal cell is disposed.

4 Claims, 1 Drawing Sheet

SEMICONDUCTOR LASER DEVICE

This invention relates to a semiconductor laser package structure.

BACKGROUND OF THE INVENTION

A conventional packaged semiconductor laser device is shown in FIG. 1. This packaged semiconductor laser device comprises a laser diode element 1, a mount 2 on which the laser diode element 1 is mounted, a heat sink 3 comprising, for example, Ag or Au, for absorbing heat generated by the laser diode element 1, a stem 4 on which the heat sink 3 is mounted, and a cap 5 with a hole formed in its top wall placed over the stem 4 for hermetically sealing the device. Laser light goes out through the hole. In other conventional devices, for example, MITSUBISHI InGaAsP laser diode ML8611 or ML8701, a glass plate transmissive to laser light is mounted in the hole. When such a conventional device is coupled to, for example, an optical fiber of an optical communications system, part of the laser light may be reflected back to the laser device from the joint between the semiconductor laser device and the optical fiber, pass through the glass plate and return to the laser diode. Such reflected light disturbs stable oscillations of the laser diode, which could result in undesirable variations in a current-voltage characteristic, an increase of the number of longitudinal modes, an increase in noise etc. In order to prevent reflected laser light from returning to the laser diode, the device shown in FIG. 1 includes an optical isolator comprising a pair of polarizers 61 and 62 formed of, for example, calcite, and a Faraday rotator 10 disposed between the polarizers 61 and 62. The polarizers 61 and 62 with the Faraday rotator 10 disposed therebetween are mounted in the hole. A permanent magnet 11 for the Faraday rotator 10 is also mounted in the hole. The directions of polarization of the pair of polarizers 61 and 62 are angularly displaced by 45° from each other.

In operation, laser light emitted by the laser diode 1 passes through the polarizer 61 and then through the Faraday rotator 10. As the light passes through the Faraday rotator 10, its plane of polarization is rotated by 45°. Then, the rotated laser light goes out through the other polarizer 62. A part of the laser light which has passed through the polarizer 62 may be reflected back to the semiconductor device from, for example, a joint between the semiconductor laser device and an optical fiber external to the laser device. This reflected light again passes through the polarizer 62, has its plane of polariation further rotated by 45° by the Faraday rotator 10 and arrives at the other polarizer 61. Thus, the plane of polarization of this reflected light after it has passed the polarizer 61 has been rotated by 90° relative to that of the initially emitted light, and, therefore, the reflected light cannot pass through the polarizer 61 and is effectively blocked. Thus, the semiconductor laser device of the FIG. 1 is free of adverse effects of returning laser light and can operate stably.

However, since the conventional semiconductor laser device described above uses the permanent magnet 11, a magnetic field is generated by the magnet 11, which could cause contamination of the device by foreign particles. Furthermore, this conventional device cannot be used in a system which cannot properly operate in the presence of a magnetic field. In addition, this conventional semiconductor laser device is expensive, because it employs a Faraday rotator.

SUMMARY OF THE INVENTION

The present invention can eliminate the above-described problems by providing a novel semiconductor laser device which can prevent reflected laser light from returning to the laser element without resort to a magnetic field generating component.

According to the present invention, a semiconductor laser device includes reflected-light blocking means which comprises a twisted-nematic liquid crystal cell and a pair of polarizers disposed on opposite sides of the liquid crystal cell. The return light blocking means is mounted in a laser light emitting hole formed in a cap which hermetically seals the device.

In the semiconductor laser device of the present invention, the twisted-nematic liquid crystal cell blocks reflected light without the necessity of generating a magnetic field and at a low cost.

DETAILED DESCRIPTION OF PREFERRED EMBODIMENT

Now, one embodiment of the present invention is described in detail with reference to the drawings.

Figure 2:
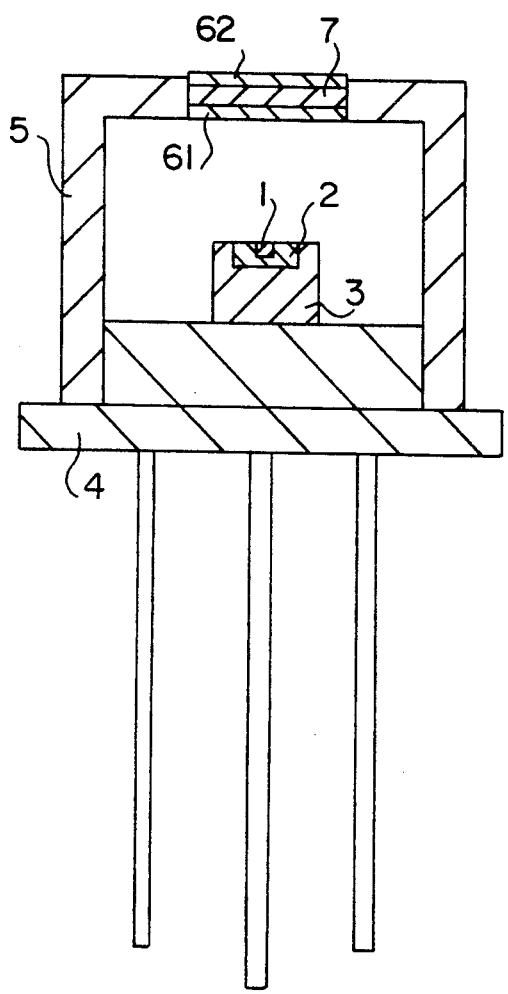
FIG. 2 is a cross-sectional view of a semiconductor laser device according to one embodiment of the present invention.
Figure 1:
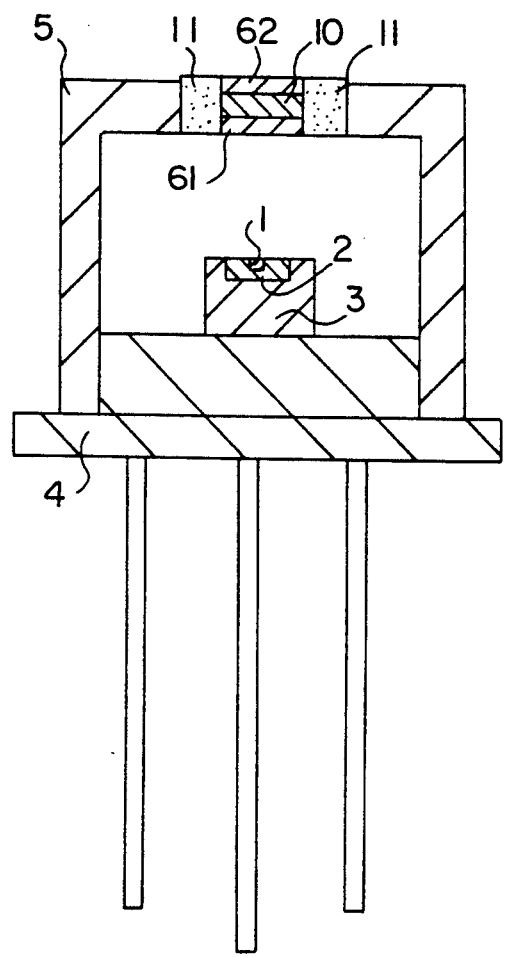
FIG. 1 is a cross-sectional view of a conventional semiconductor laser device.

In FIG. 2, there is shown a semiconductor laser device according to one embodiment of the present invention. This semiconductor laser device includes an optical isolator or reflected-light blocking means which comprises a twisted-nematic (TN) liquid crystal cell 7. The orientation of molecules of the TN liquid crystal on the polarizer 62 side of the cell 7 is twisted by 45° relative to the orientation of molecules on the polarizer 61 side so that the polarization of light passing through the cell is rotated by 45°. In FIG. 2, the reference numerals that are the same as those used in FIG. 1 designate similar components.

In operation, laser light emitted from the laser diode 1 first passes through the polarizer 61 and, then, enters the TN liquid crystal cell 7. As laser light passes through the cell 7, its plane of polarization is rotated by 45°. The 45° rotated laser light then passes, through the other polarizer 62. The part of the laser light which may be reflected toward the laser device from a joint between the laser device and the optical fiber, again passes through the polarizer 62 and the TN liquid crystal cell 7. As the reflected laser light passes through the cell 7, the polarization of the reflected light is again rotated by 45°. Thus, the polarization of reflected light which has passed through the cell 7 and arrived at the polarizer 62 has been rotated by 90° in total relative to the laser light emitted by the laser diode 1, and, consequently, the reflected light cannot pass through the polarizer 61 and, hence, cannot return to the laser diode 1. Thus, stable operation of the semiconductor laser device can be maintained, because the operation of the laser diode 1 is not disturbed by reflected laser light.

As described above, according to the present invention, laser light reflected back to a semiconductor laser device is prevented from returning to a laser light emitting element, by means of an inexpensive optical isolator employing a twisted-nematic liquid crystal cell which can operate without resort to a magnetic field. Accordingly, the semiconductor laser device of the present invention can be used in a system in which no magnetic field needs to be present. Furthermore, the semiconductor laser device of the present invention can be manufactured at a low cost, because it does not use an expensive Faraday rotator.

What is claimed is:

1. A semiconductor laser device comprising:
   a laser element which emits laser light;
   a cap covering and hermetically sealing said laser element within a package, said cap having, in its top wall, a hole through which laser light is emitted; and
   reflected light blocking means disposed in said hole in said top wall of said cap
   wherein said reflected light blocking means comprises a twisted-nematic liquid crystal cell and a pair of polarizers between which said twisted-nematic liquid crystal cell is disposed.

2. A semiconductor laser device according to claim 1 wherein said twisted-nematic liquid crystal cell rotates the plane of polarization of laser light by 45° as laser light passes through said cell, and the polarization directions of said polarizers are separated by 45°.

3. A semiconductor laser device according to claim 1 wherein said polarizers comprise calcite.

4. A semiconductor laser device according to claim 2 wherein said polarizers comprise calcite.

* * * * *